US011687399B2

(12) United States Patent
Verma et al.

(10) Patent No.: US 11,687,399 B2
(45) Date of Patent: Jun. 27, 2023

(54) MULTI-CONTROLLER DECLARATIVE FAULT MANAGEMENT AND COORDINATION FOR MICROSERVICES

(71) Applicant: International Business Machines Corporation, Armonk, NY (US)

(72) Inventors: Mudit Verma, New Delhi (IN); Dushyant K. Behl, Bangalore (IN); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/376,419

(22) Filed: Jul. 15, 2021

(65) Prior Publication Data
US 2023/0023744 A1    Jan. 26, 2023

(51) Int. Cl.
  *G06F 11/00*   (2006.01)
  *G06F 11/07*   (2006.01)
  *G06F 11/30*   (2006.01)

(52) U.S. Cl.
  CPC ...... *G06F 11/0793* (2013.01); *G06F 11/0706* (2013.01); *G06F 11/0751* (2013.01); *G06F 11/3006* (2013.01); *G06F 11/3051* (2013.01)

(58) Field of Classification Search
  CPC ............. G06F 11/0703; G06F 11/0706; G06F 11/0709; G06F 11/0712; G06F 11/0751;
  (Continued)

(56) References Cited

U.S. PATENT DOCUMENTS 6,665,262 B1    12/2003   Lindskog et al.
9,286,471 B2 *   3/2016   Qureshi ................... G06F 8/53
(Continued)

OTHER PUBLICATIONS

Rossi, Fabiana, Valeria Cardellini, and Francesco Lo Presti. "Hierarchical scaling of microservices in Kubernetes." In 2020 IEEE International Conference on Autonomic Computing and Self-Organizing Systems (ACSOS), pp. 28-37. IEEE, 2020. (Year: 2020).*

(Continued)

*Primary Examiner* — Anthony J Amoroso
(74) *Attorney, Agent, or Firm* — Ryan, Mason & Lewis, LLP

(57) ABSTRACT

Methods, systems, and computer program products for multi-controller declarative fault management and coordination for microservices are provided herein. A computer-implemented method includes processing information pertaining to at least one fault impacting multiple resources within a given system, wherein respective portions of the multiple resources are managed by multiple independent controllers; determining, by each of at least a portion of the multiple independent controllers and based at least in part on the processing of the information, one or more desired resource states and one or more remediation actions; generating, based at least in part on one or more of the determined desired resource states and the determined remediation actions, a sequential ordering of the determined remediation actions to be carried out by the at least a portion of the multiple controllers; and automatically initiating execution of the determined remediation actions in accordance with the generated sequential ordering.

16 Claims, 5 Drawing Sheets

(58) Field of Classification Search
CPC .............. G06F 11/079; G06F 11/0793; G06F 11/3003; G06F 11/3006; G06F 11/301; G06F 11/3048; G06F 11/3051; G06F 11/3055; G06F 11/34

See application file for complete search history.

(56) References Cited

U.S. PATENT DOCUMENTS

| | | | | |
|---|---|---|---|---|
| 9,645,811 | B2* | 5/2017 | Carlen | H04L 67/34 |
| 10,015,268 | B2* | 7/2018 | Rao | H04L 45/64 |
| 10,025,678 | B2 | 7/2018 | Alderman et al. | |
| 10,437,754 | B1* | 10/2019 | Ebisuzaki | G06F 13/1668 |
| 11,196,627 | B1* | 12/2021 | Khoo | H04L 41/0816 |
| 2016/0357625 | A1 | 12/2016 | Balakrishnan | |
| 2017/0006135 | A1* | 1/2017 | Siebel | G06Q 10/06 |
| 2017/0161101 | A1* | 6/2017 | Khazanchi | H04L 67/01 |
| 2017/0168900 | A1* | 6/2017 | Lucas | G06F 11/1417 |
| 2018/0321833 | A1* | 11/2018 | Nelson | G06F 16/27 |
| 2022/0413956 | A1* | 12/2022 | Mathew | G06F 11/0721 |

OTHER PUBLICATIONS

Su, Chuan-Jun, and Chang-Yu Chiang. "Enabling successful Collaboration 2.0: A REST-based Web Service and Web 2.0 technology oriented information platform for collaborative product development." Computers in Industry 63, No. 9 (2012): pp. 948-959. (Year: 2012).*

Shetty et al., Proactive cloud service assurance framework for fault remediation in cloud environment, International Journal of Electrical and Computer Engineering, Feb. 2020.

Rossi et al., Hierarchical Scaling of Microservices in Kubernetes, IEEE International Conference on Autonomic Computing and Self-Organizing Systems, Aug. 2020.

Kubernetes, Cloud Controller Manager, Aug. 2020. https://kubernetes.io/docs/concepts/architecture/cloud-controller/.

Li, L., Allocation Failure and Remediation, Microsoft Azure, Mar. 2015.

Alvares de Oliveira et al., A Framework for the Coordination of Multiple Autonomic Managers in Cloud Environments, IEEE 7th International Conference on Self-Adaptive and Self-Organizing Systems, Sep. 2013.

Chafle et al., Handling faults in decentralized orchestration of composite web services (ICSOC 2005).

Fabre et al., Algorithms for Distributed Fault Management in Telecommunications Networks (ICT 2004).

Dvorak, D., Goal-based fault management, 2012 NASA Spacecraft Fault Management Workshop.

Javed et al., IoTEF: A Federated Edge-Cloud Architecture for Fault-Tolerant IoT Applications, Journal of Grid Computing, Jan. 2020.

Huang et al., Differentiated Failure Remediation with Action Selection for Resilient Computing (PRDC 2015).

* cited by examiner

MULTI-CONTROLLER DECLARATIVE FAULT MANAGEMENT AND COORDINATION FOR MICROSERVICES

BACKGROUND

The present application generally relates to information technology and, more particularly, to fault management. More specifically, faults may occur across a stack that includes, for example, hardware, infrastructure (including, e.g., compute resources, network resources, storage resources, etc.), virtualization layers, microservices, and/or applications. A need commonly exists to correlate faults across the stack to minimize alarms, as well as to provide a cohesive framework for data collection, analytics and event generation. However, challenges exist in attempts to provide solutions to such needs, as the solutions must often be balanced with decentralized control for remediation actions, as resources at different layers (e.g., applications, microservices, and infrastructure) may need to be orchestrated differently and managed by different controllers (e.g., operators in Kubernetes). Further, the status of faults and resources can change dynamically, and multiple remediation actions may be simultaneously undertaken.

SUMMARY

In one embodiment of the present invention, techniques for multi-controller declarative fault management and coordination for microservices are provided. An exemplary computer-implemented method can include processing information pertaining to at least one fault impacting multiple resources within a given system, wherein respective portions of the multiple resources are managed by multiple independent controllers. The method also includes determining, by each of at least a portion of the multiple independent controllers and based at least in part on the processing of the information, one or more desired resource states and one or more remediation actions, and generating, based at least in part on one or more of the determined desired resource states and the determined remediation actions, a sequential ordering of the determined remediation actions to be carried out by the at least a portion of the multiple controllers. Further, the method also includes automatically initiating execution of the determined remediation actions in accordance with the generated sequential ordering.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
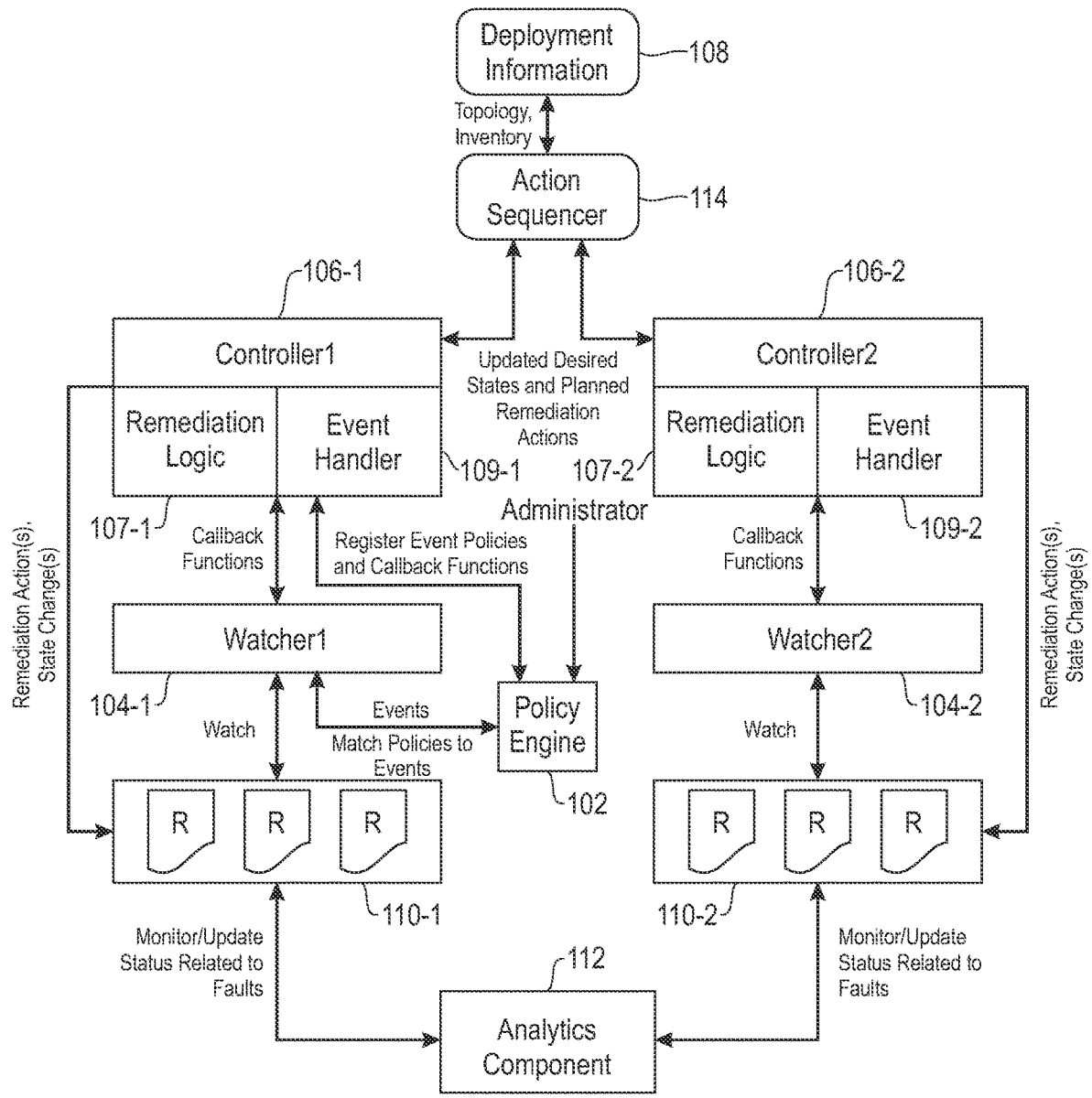
FIG. 1 is a diagram illustrating system architecture, according to an exemplary embodiment of the invention.

As described herein, an embodiment of the present invention includes multi-controller declarative fault management and coordination for microservices in an environment such as, e.g., a Kubernetes environment. By way merely of illustration, consider a first example use case, wherein a host node failure causes an application that leverages a microservice running on that host node to stop responding to client requests. Additionally, in such an example use case, independent controllers exist for the host node (e.g., infrastructure), microservice pod, and application resources. The order of status reporting can comprise the following: (i) the application first reports failure to service client requests, (ii) the microservice is not responding to a heartbeat, and (iii) the host node has crashed.

As used herein, a node refers to a physical machine or virtual machine that provides compute, networking, and storage resources to execute applications. A collection of nodes form a cluster of computing resources that can be managed together. Additionally, applications can be deployed on such a cluster of nodes as one or more pods, wherein a pod refers to the smallest deployable unit of computing that is created and managed on the cluster as a single entity. By way of example, a pod may contain one or more containers that require compute resources to execute.

Further, in such an example use case, remediation actions can include the microservice controller first deciding to restart the container, and the host node controller deciding to restart the node. In such a scenario, the microservice controller needs to realize that restarting the container is futile, and as such, the microservice controller will need to migrate the container along with any necessary state information. Accordingly, in such an example use case, the microservice controller will also migrate the pod, but with fewer resources so as to not overburden the system. Additionally, the host node is restarted and the failure is remediated. Post-remediation, with capacity restored, the microservice controller can resize the pod with increased resources.

The above-noted example use case requires coordination for failure detection as well as remediation across different independent controllers.

By way of further illustration, consider a second example use case, wherein a webserver running in one cluster accesses a database present in a different cluster, and a failure in the network link between the webserver and the database causes the webserver to fail with a database error. In such an example use case, independent controllers exist for the application, the database, the clusters, and the software-defined networking (SDN) component(s) for the network link. The order of status reporting can comprise the following: (i) the application first reports the database failure while servicing client requests, (ii) the database does not respond to a heartbeat, and (iii) the network link between the webservice and the database is noted as down.

Further, in such an example use case, remediation actions can include the application controller first deciding to load balance to a different database, and the database controller then deciding to restart the database container on a different node. Also, the SDN node controller decides to reroute the network via some other path, the application controller rebalances again when the connection comes up, and the database controller migrates the pod, but with fewer resources so as to not overburden the new system. Subsequently, the SDN re-routes the network link and the failure is remediated. Post-remediation, with capacity restored, the application controller rebalances the connection with the database controller, and resizes the pod with increased resources.

This example use case, as detailed above, also requires coordination for failure detection and remediation across different independent controllers, as the controllers change the desired state of components dynamically.

By way of yet further illustration, consider a third example use case, which involves a telecommunication deployment wherein user calls/transactions are handled by three voice over internet protocol (VoIP) servers via a gateway. The gateway receives requests from the users and load-balances the requests to the backend VoIP servers. The gateway and the VoIP servers are independently managed by respective controllers. In this example use case, assume that one of the VoIP servers fails, causing some of the user transactions to fail. Both the gateway controller and the VoIP controller receive information about the fault independently, and separately plan a remediation.

With respect to remediations, having received the fault notification, the gateway controller changes its intended state to "2 active VoIP servers" and disables the faulty VoIP from the gateway's list. User transactions are then load-balanced across the two healthy VoIP servers, and the VoIP controller restarts the faulty server and sends a notification to the gateway controller. The gateway controller then re-enables the faulty server, and user calls/transactions are again load-balanced across all three VoIP servers.

FIG. 1 is a diagram illustrating system architecture, according to an embodiment of the invention. By way of illustration, and as further detailed below, FIG. 1 depicts a policy engine 102, watcher1 104-1 and watcher2 104-2, controller1 106-1 (which includes remediation logic 107-1 and event handler 109-1) and controller2 106-2 (which includes remediation logic 107-2 and event handler 109-2), action sequencer 114, deployment information 108, resources (R) 110-1 and 110-2 (collectively referred to herein as resources 110), and an analytics component 112.

Resources 110 can include component units of the given system that may be of different resource types across the corresponding stack (e.g., central processing unit (CPU), memory resources, compute and storage nodes, microservice containers and/or pods, composite applications and/or services, etc.), and at least a portion of the resources 110 can have a specification that includes the current state and desired state corresponding thereto. At least portions of resources 110 are managed by controllers 106-1 and 106-2, wherein such controllers, for example, manage the state of resources, determine changes to one or more desired states, and determine one or more remediation actions to take to match the desired state(s) of at least a portion of the resources managed by the given controller.

Policy engine 102, in one or more embodiments, adds, modifies, and/or holds a registry of policy rules for actions to take when an event is received. Controllers 106-1 and 106-2 register policies with actions to invoke callback functions upon receipt of specific events. By way merely of example, a callback function can include a representational state transfer (REST) application programming interface (API) endpoint to be invoked over a hypertext transfer protocol (HTTP) connection. Alternatively, for example, a callback function can include a remote procedure call to be invoked using a remote procedure call framework. Also, policy engine 102 can match events to registered policy rules. As additionally illustrated in FIG. 1, analytics component 112 continuously monitors resources 110 for any changes and/or updates to current state information, particularly, for example, with respect to state information in connection with a fault.

Watchers 104-1 and 104-2 watch/monitor one or more of the resources 110 for changes in their current state, trigger events to policy engine 102 corresponding to any impacted resources, and invoke callback functions received as actions from the policy engine 102. Such callback functions can include, for example, notifying controllers 106-1 and 106-2 for further coordination. Action sequencer 114 receives information pertaining to concurrent actions planned by controller 106-1 and controller 106-2, correlates and localizes at least one fault impacting one or more of the resources 110, and sequences the actions to be taken by controller 106-1 and controller 106-2 into a workflow, leveraging topology and deployment information 108 pertaining to the given environment.

Additionally, an example workflow such as depicted within the FIG. 1 architecture can be described as follows. One or more pods and one or more nodes are monitored by watcher 104-1 and watcher 104-2, and it is observed that a failure at one such node causes a pod to also fail. Analytics component 112 determines that the fault and status are updated in the customer resource of both the node and the pod as failed. As used herein, Kubernetes permits defining custom resources that make Kubernetes modular and extensible. Custom resources permit creation, storage and retrieval of structured data, including the specification of the desired state of the custom resource. Custom resources can be managed, for example, by a custom controller, monitoring the state of the resource and taking action if the current state of the custom resource does not match the intended/desired state.

Watcher 104-1 and watcher 104-2 read the fault events from both custom resources, and policy engine 102 determines that the pod failure needs to be notified to the pod controller (e.g., 106-1 or 106-2) and to the node controller (e.g., the other of 106-1 or 106-2 that is not the pod controller). Event handlers (109-1 and 109-2) at the node controller and pod controller receive the fault notifications, and one or more remediation actions are determined and/or identified (but no action is taken yet at this point). By way merely of example, remediation actions might include restarting the pod and restarting the node. Controllers 106-1 and 106-2 then send information pertaining to the new desired states and/or remediation actions to action sequencer 114, and the action sequencer 114 determines the order of actions (e.g., the node is restarted first) and notifies both controllers (106-1 and 106-2).

Subsequently, in one or more embodiments, each controller's intended state and/or remediation status is changed from "restarted" to "migrate," and such a change is approved by action sequencer 114. Accordingly, the node is then restarted, and the pod is migrated parallelly. When the node comes back up, the controller (corresponding to the pod) can (optionally) determine that the POD is to be migrated back.

As detailed herein in connection with one or more embodiments, independent controllers are self-sufficient in managing the resources each controller owns and/or is assigned. Such controllers are able to take actions on such resources and manage the state(s) thereof. As illustrated in FIG. 1, each controller (106-1, 106-2) includes an event handler (109-1, 109-2, respectively), which receives information pertaining to fault events from watchers (104-1, 104-2, respectively). The controllers also determine remediation actions (e.g., preconfigured actions, intelligence-related actions, analytics actions, etc.), and run at least one control loop to manage the state(s) of at least one resource 110.

In at least one embodiment, controllers can be implemented using the operators in a container orchestration platform such as, for example, Kubernetes, running as a pod with permissions to modify other resources (roles). Event handling, in one or more embodiments, can be performed by implementing a module that continuously listens to events related to the resources managed by the given controller. Also, a controller holds the current state(s) of its managed resource(s) using, for example, a custom resource definition, and of the native constructs, and runs the playbooks (e.g., remediation actions) against at least one fault event. As used herein, a native construct refers to any Kubernetes-native or built-in resources that are provided out-of-the-box by Kubernetes. For instance, a controller may monitor the state of a custom resource as well as other pods in the system before determining what action to take on the custom resource.

Playbooks such as noted above can be preconfigured, pre-supplied, and/or implemented as per a given application and/or workload. Each such controller can run a state machine that continuously attempts to bring a given resource to its indented state (as per the remediation action). Further, such a controller applies one or more given changes to the resource definitions that are managed, for example, by lower-level controllers (e.g., native controllers from Kubernetes).

As also illustrated in FIG. 1 and further detailed herein, policy engine 102 provides a policy framework to program actions which need to be taken when a fault occurs. Controllers (e.g., 106-1 and 106-2) can register a particular action (for example, a callback function) which needs to be invoked when a given event indication is received. Such policies, compiled as event-condition-action rules, are managed in a registry by the policy engine 102. Watchers (e.g., 104-1 and 104-2) can subscribe to the policy engine 102 to share event information with the policy engine and run callback functions with at least one particular controller (e.g., 106-1 and/or 106-2), wherein the callback functions are provided by the policy engine. Also, as depicted in FIG. 1, policy engine 102 can support additions of and/or modification to policies by at least one administrator.

Additionally, analytics component 112 continuously monitors resource behavior (e.g., logs, metrics, indicators, etc.) to detect any changes to resource state and predict occurrence of faults. In at least one embodiment, analytics component 112 contains a pre-trained model of normal steady state resource behavior, and such a model can be used in connection with updating resource status information with an event that needs to be handled whenever a given fault occurs.

As also detailed herein, watchers (e.g., 104-1 and 104-2) watch and/or monitor one or more resources (e.g., 110) and detect an event when a resource status is updated with fault information by the analytics component 112. Watchers also register with the policy engine 102 to obtain information on controller callback functions to call based on the event. Further, such watchers relay event information to one or more controllers (e.g., 106-1 and/or 106-2) by issuing one or more callbacks.

Additionally, action sequencer 114 can, in at least one embodiment, be implemented as a standalone program (e.g., a pod) which takes inputs (e.g., by connecting to other input modules) such as topology information (used, e.g., to determine how microservices and/or components are connected), stack information (used, e.g., to determine which infrastructure component(s) and/or middleware is used by a given component (e.g., a particular container is running on a node, a service uses a particular storage device, etc.), and configuration information (e.g., Kubernetes manifests).

Accordingly, by way of illustration, consider an example embodiment wherein inputs (such as, e.g., detailed above) are used to create a directed acyclic graph (DAG) of connected components, both at an application level and an infrastructure and middleware level. Additionally, such an example embodiment also includes utilizing a knowledge graph, which can include using a program that also takes input on what different components carry more weightage and/or importance. For example, assume that pods are hosted on a given node and, therefore, impact on the node directly impacts the pods. By way of further example, assume that a gateway is more important than individual VoIP server instances in a given system. Additionally or alternatively, in one or more embodiments, faults emitted from different component calls can be preconfigured into different priority classes. By way of example: {fault type A, fault type B} → priority 1; {fault type C, fault type D} → priority 2.

Continuing with the above-noted example embodiment, the following algorithm can be used: Determine if the observed fault events may have a common root cause by checking whether the components pertaining to the failure events are related as per the created DAG. If yes, then sequencing of any remediation actions may be needed. In such an embodiment, sequencing is needed (as a DAG), and fault information is matched to the knowledge graph and ordered using the inputs related to the knowledge graph. Generating an ordering list can include, for example, determining that fault 1 is to be remediated (e.g., the fault at the node), then fault 2 is to be remediated (e.g., the fault at the pod), then fault 3 is to be remediated, then fault 4 is to be remediated, etc. Also, in such an embodiment, callback functions for the given remediation actions are sent to the respective controllers in the specified order.

Additionally or alternatively, consider an embodiment wherein the faults are not connected and can be remediated in parallel. In such an embodiment, controllers can be notified that their actions can be taken in parallel (e.g., {Remediate fault 1, fault 2, fault 3 in parallel}, then fault 4). By way of illustration, assume, for example, that pod1 and pod2 are running on a node, and the remediation action order is determined to be remediate the fault at the node, and then remediate the fault at pod1 and the fault at pod2 in parallel. In such an embodiment, an action sequencer can expose one or more APIs to push/pull at least a portion of the above-noted inputs, as well as expose one or more APIs to receive fault information from two or more connectors and send back an ordering or remediation actions to the respective controllers. As such, the controllers are aware of the sequencer a priori and do not remediate a fault without approval from sequencer. Additionally, it is to be appreciated that all related faults may not arrive at the same time, and hence, windowed evaluation can be performed in one or more embodiments.

Figure 2:
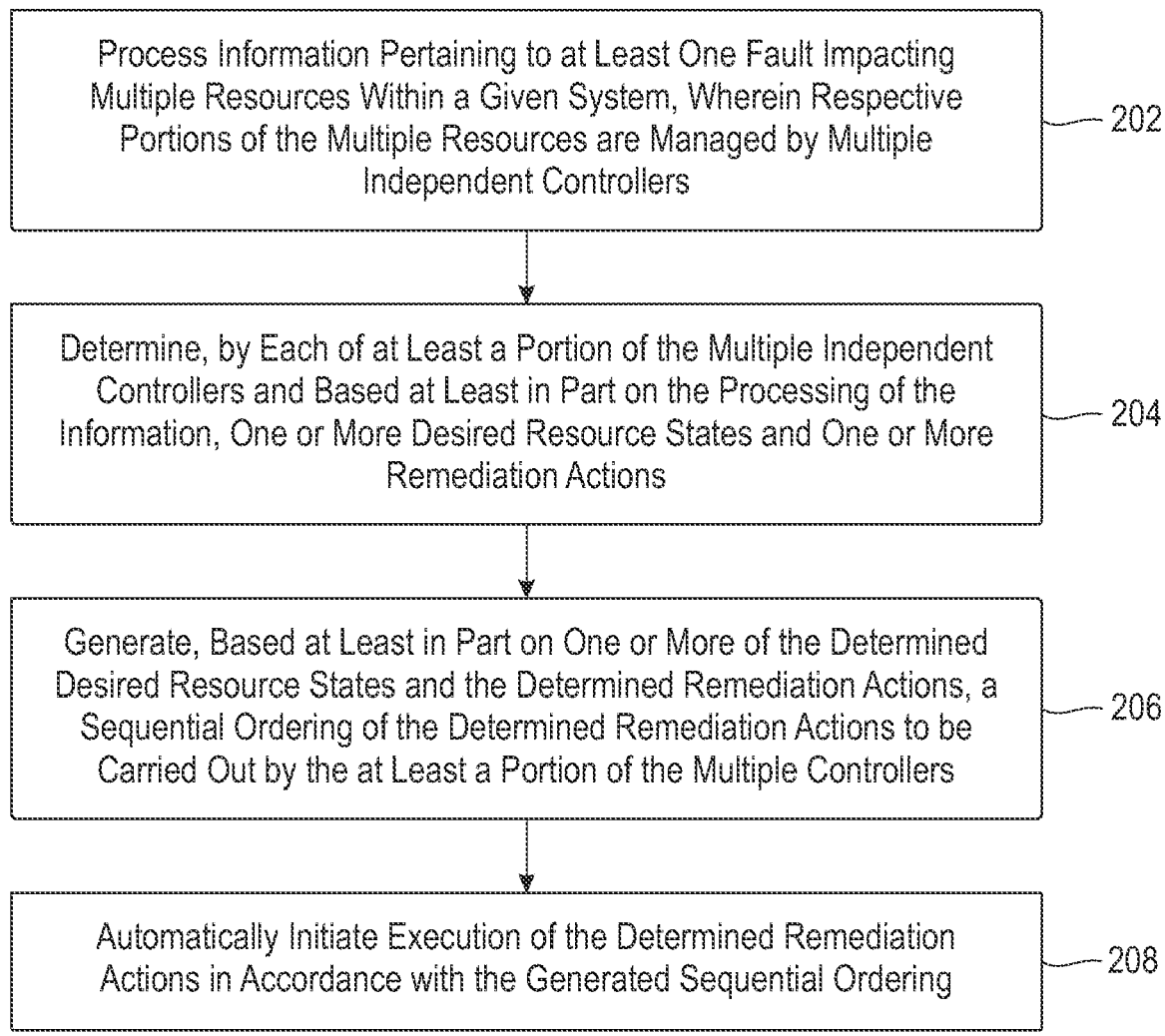
FIG. 2 is a flow diagram illustrating techniques according to an embodiment of the invention.

FIG. 2 is a flow diagram illustrating techniques according to an embodiment of the present invention. Step 202 includes processing information pertaining to at least one fault impacting multiple resources within a given system, wherein respective portions of the multiple resources are managed by multiple independent controllers. In at least one embodiment, the multiple resources include one or more of infrastructure resources, component microservices of at least one application, and one or more composite applications. One or more embodiments can also include continuously monitoring the multiple resources and recording changes to state information due to one or more faults.

In at least one embodiment, the multiple independent controllers include multiple operators in a Kubernetes system. Further, processing information pertaining to at least one fault can include invoking callback functions of at least a portion of the multiple independent controllers. Additionally or alternatively, processing information pertaining to at least one fault can include matching one or more system policies to at least a portion of the information pertaining to the at least one fault.

Step 204 includes determining, by each of at least a portion of the multiple independent controllers and based at least in part on the processing of the information, one or more desired resource states and one or more remediation actions. In at least one embodiment, determining the one or more desired resource changes includes recording the one or more determined desired resource changes using at least one fault localization module.

Step 206 includes generating, based at least in part on one or more of the determined desired resource states and the determined remediation actions, a sequential ordering of the determined remediation actions to be carried out by the at least a portion of the multiple controllers. In one or more embodiments, the sequential ordering of the determined remediation actions can include one or more concurrent remediation actions. Also, in at least one embodiment, generating the sequential order includes leveraging system topology information and system configuration information.

Step 208 includes automatically initiating execution of the determined remediation actions in accordance with the generated sequential ordering. Also, in one or more embodiments, software implementing the techniques depicted in FIG. 2 can be provided as a service in a cloud environment.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
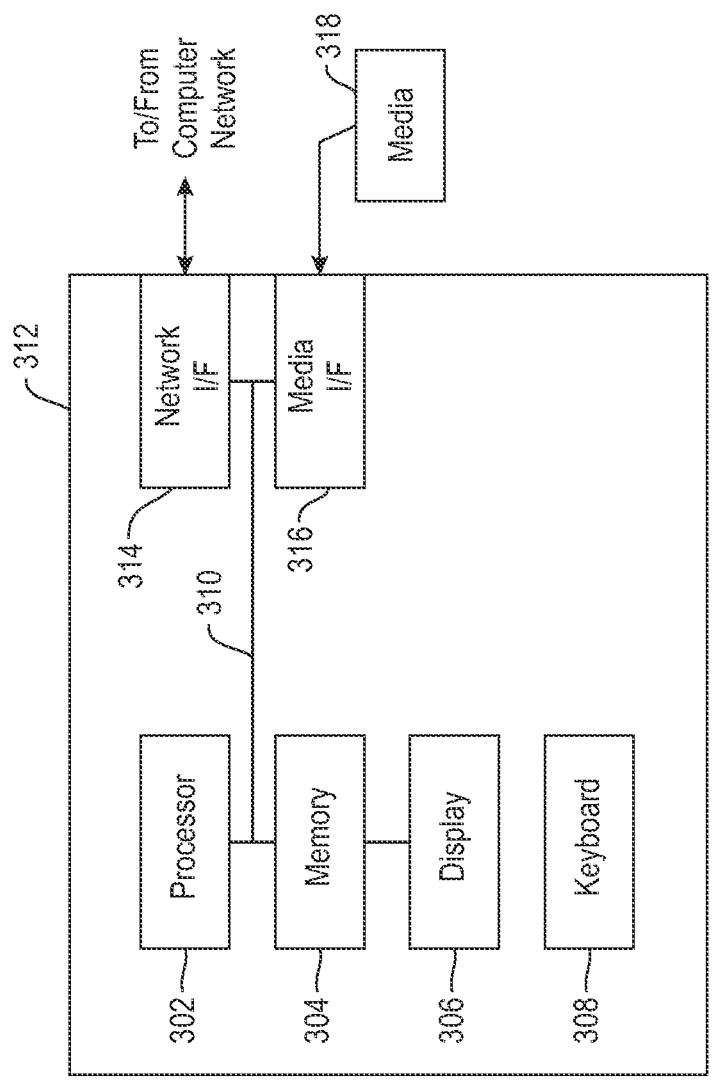
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
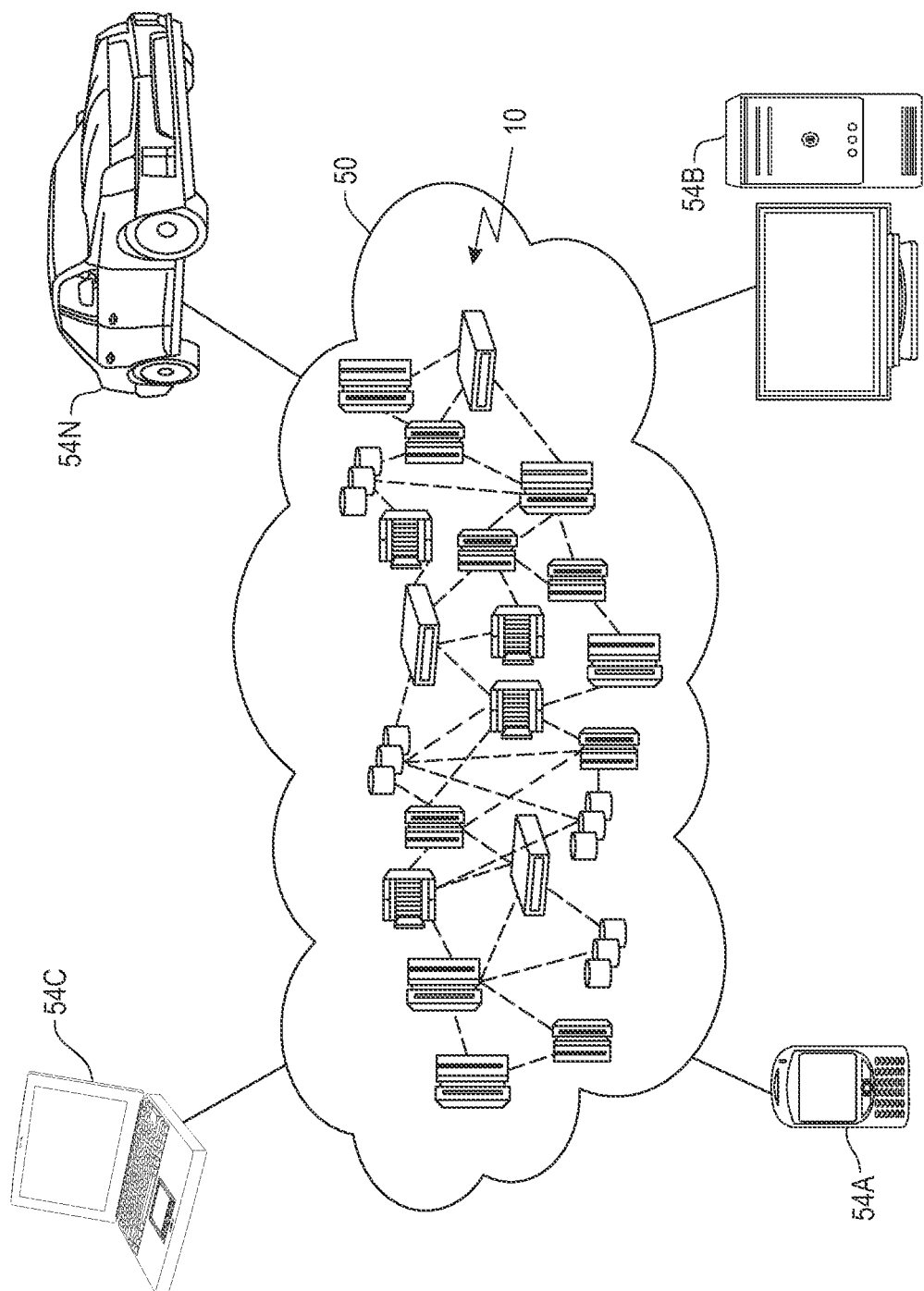
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
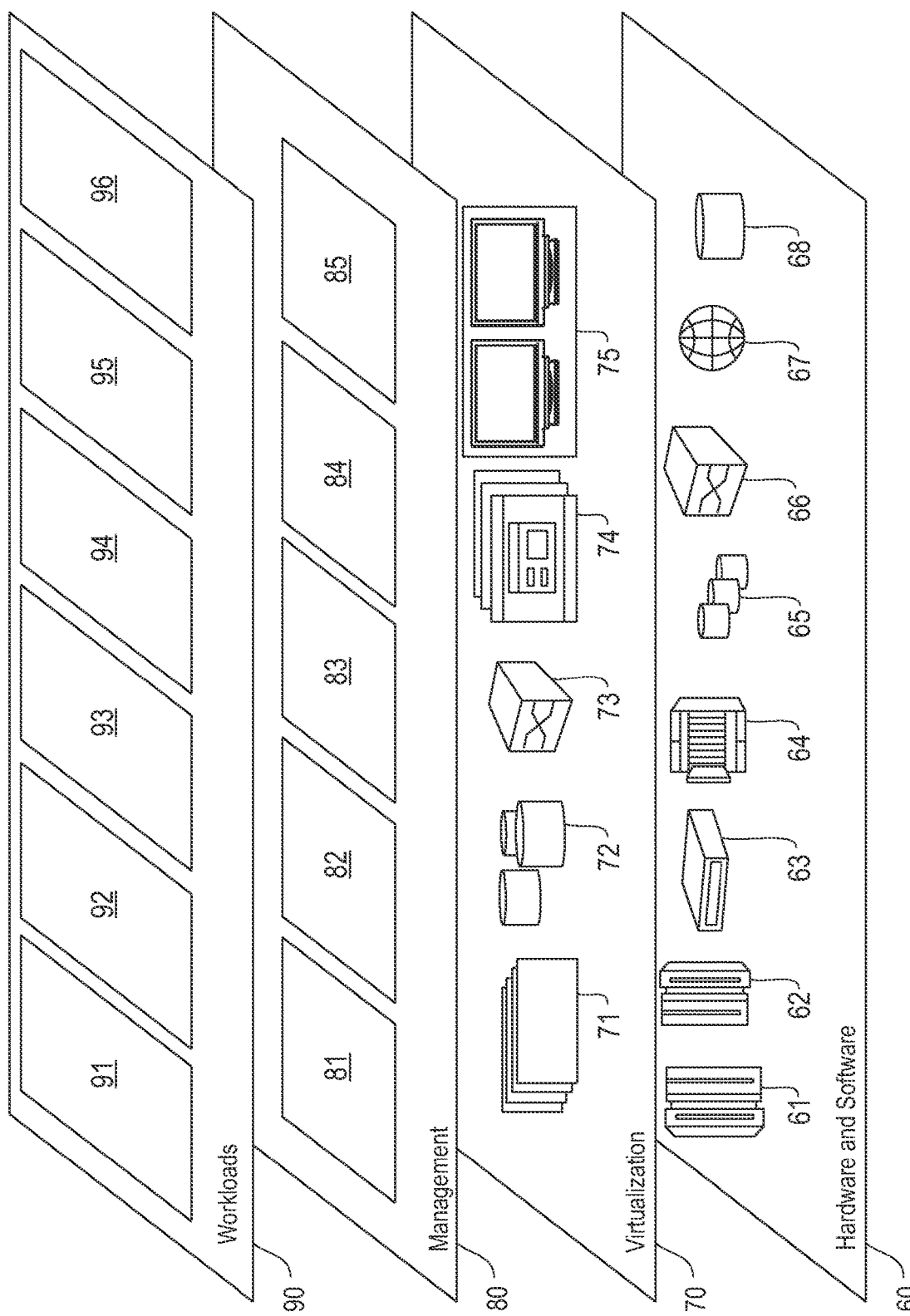
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fault management and microservices coordination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automated multi-controller declarative fault management and coordination for microservices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
implementing, using at least a portion of multiple independent controllers, at least one registry comprising one or more policy rules associated with one or more actions to be carried out in connection with occurrence of one or more specified events;
processing information pertaining to at least one fault impacting multiple resources within a given system, wherein respective portions of the multiple resources are managed by the multiple independent controllers, wherein processing information pertaining to at least one fault comprises invoking, upon detecting occurrence of at least one of the one or more specified events, one or more callback functions of at least a portion of the multiple independent controllers, and wherein invoking the one or more callback functions comprise invoking at least one representational state transfer application programming interface endpoint associated with the one or more callback functions over at least one hypertext transfer protocol connection;
determining, by each of at least a portion of the multiple independent controllers and based at least in part on the processing of the information, one or more desired resource states and multiple remediation actions;
generating, based at least in part on one or more of the determined desired resource states and the multiple determined remediation actions, a sequential ordering of the multiple determined remediation actions to be carried out by the at least a portion of the multiple controllers, wherein generating the sequential ordering of the multiple determined remediation actions is based at least in part on system topology information associated with the given system, stack information associated with the given system, and system configuration information associated with the given system, wherein system topology information comprises information pertaining to connections between microservices associated with the given system; and automatically initiating execution of the multiple determined remediation actions in accordance with the generated sequential ordering;

wherein the method is carried out by at least one computing device.

2. The computer-implemented method of claim 1, wherein the multiple resources comprise one or more of infrastructure resources, component microservices of at least one application, and one or more composite applications.

3. The computer-implemented method of claim 1, further comprising:
continuously monitoring the multiple resources and recording changes to state information due to one or more faults.

4. The computer-implemented method of claim 1, wherein the multiple independent controllers comprise multiple operators in a Kubernetes system.

5. The computer-implemented method of claim 1, wherein processing information pertaining to at least one fault comprises matching one or more system policies to at least a portion of the information pertaining to the at least one fault.

6. The computer-implemented method of claim 1, wherein determining the one or more desired resource states comprises recording the one or more determined desired resource states using at least one fault localization module.

7. The computer-implemented method of claim 1, wherein the sequential ordering of the multiple determined remediation actions comprises two or more concurrent remediation actions.

8. The computer-implemented method of claim 1, wherein software implementing the method is provided as a service in a cloud environment.

9. A computer program product comprising a computer readable storage medium having program instructions embodied therewith, the program instructions executable by a computing device to cause the computing device to:
implement, using at least a portion of multiple independent controllers, at least one registry comprising one or more policy rules associated with one or more actions to be carried out in connection with occurrence of one or more specified events;
process information pertaining to at least one fault impacting multiple resources within a given system, wherein respective portions of the multiple resources are managed by the multiple independent controllers, wherein processing information pertaining to at least one fault comprises invoking, upon detecting occurrence of at least one of the one or more specified events, one or more callback functions of at least a portion of the multiple independent controllers, and wherein invoking the one or more callback functions comprise invoking at least one representational state transfer application programming interface endpoint associated with the one or more callback functions over at least one hypertext transfer protocol connection;
determine, by each of at least a portion of the multiple independent controllers and based at least in part on the processing of the information, one or more desired resource states and multiple remediation actions;
generate, based at least in part on one or more of the determined desired resource states and the multiple determined remediation actions, a sequential ordering of the multiple determined remediation actions to be carried out by the at least a portion of the multiple controllers, wherein generating the sequential ordering of the multiple determined remediation actions is based at least in part on system topology information associated with the given system, stack information associated with the given system, and system configuration information associated with the given system, wherein system topology information comprises information pertaining to connections between microservices associated with the given system; and
automatically initiate execution of the multiple determined remediation actions in accordance with the generated sequential ordering.

10. The computer program product of claim 9, wherein the multiple resources comprise one or more of infrastructure resources, component microservices of at least one application, and one or more composite applications.

11. The computer program product of claim 9, wherein the program instructions executable by a computing device further cause the computing device to:
continuously monitor the multiple resources and recording changes to state information due to one or more faults.

12. The computer program product of claim 9, wherein the multiple independent controllers comprise multiple operators in a Kubernetes system.

13. The computer program product of claim 9, wherein processing information pertaining to at least one fault comprises matching one or more system policies to at least a portion of the information pertaining to the at least one fault.

14. The computer program product of claim 9, wherein determining the one or more desired resource states comprises recording the one or more determined desired resource states using at least one fault localization module.

15. The computer program product of claim 9, wherein the sequential ordering of the multiple determined remediation actions comprises two or more concurrent remediation actions.

16. A system comprising:
a memory configured to store program instructions; and
a processor operatively coupled to the memory to execute the program instructions to:
implement, using at least a portion of multiple independent controllers, at least one registry comprising one or more policy rules associated with one or more actions to be carried out in connection with occurrence of one or more specified events;
process information pertaining to at least one fault impacting multiple resources within a given system, wherein respective portions of the multiple resources are managed by the multiple independent controllers, wherein processing information pertaining to at least one fault comprises invoking, upon detecting occurrence of at least one of the one or more specified events, one or more callback functions of at least a portion of the multiple independent controllers, and wherein invoking the one or more callback functions comprise invoking at least one representational state transfer application programming interface endpoint associated with the one or more callback functions over at least one hypertext transfer protocol connection;
determine, by each of at least a portion of the multiple independent controllers and based at least in part on the processing of the information, one or more desired resource states and multiple remediation actions;

generate, based at least in part on one or more of the determined desired resource states and the multiple determined remediation actions, a sequential ordering of the multiple determined remediation actions to be carried out by the at least a portion of the multiple controllers, wherein generating the sequential ordering of the multiple determined remediation actions is based at least in part on system topology information associated with the given system, stack information associated with the given system, and system configuration information associated with the given system, wherein system topology information comprises information pertaining to connections between microservices associated with the given system; and automatically initiate execution of the multiple determined remediation actions in accordance with the generated sequential ordering.

* * * * *